United States Patent [19]

Ishizeki

[11] Patent Number: 4,926,683
[45] Date of Patent: May 22, 1990

[54] METHOD OF TESTING A SET OF WHEEL SPEED SENSORS FORMING PARTS OF AN ANTI-LOCK BRAKE CONTROL SYSTEM

[75] Inventor: Seiichi Ishizeki, Tokyo, Japan

[73] Assignee: Fuji Jukogyo Kabushiki Kaisha, Tokyo, Japan

[21] Appl. No.: 407,137

[22] Filed: Sep. 14, 1989

Related U.S. Application Data

[62] Division of Ser. No. 304,184, Jan. 31, 1989.

[30] Foreign Application Priority Data

Feb. 3, 1988 [JP] Japan .................................. 63-23527

[51] Int. Cl.$^5$ ........................................... G01M 19/00
[52] U.S. Cl. ...................................... 73/118.1; 303/92
[58] Field of Search .................. 73/2, 118.1, 121, 123, 73/129; 340/52 R, 52 B, 54; 303/92; 364/426.02

[56] References Cited

U.S. PATENT DOCUMENTS

| | | | |
|---|---|---|---|
| 3,680,923 | 8/1972 | Peterson et al. | 303/92 |
| 3,988,599 | 10/1976 | Fleagle | 303/97 |
| 4,192,180 | 3/1980 | Gerstenmeier et al. | 73/121 |
| 4,656,588 | 4/1987 | Kubo | 303/92 |
| 4,700,304 | 10/1987 | Byrne et al. | 303/92 |
| 4,722,576 | 2/1988 | Matsuda | 303/92 |
| 4,805,447 | 2/1989 | Meguro et al. | 73/121 |

FOREIGN PATENT DOCUMENTS 2942442 5/1981 Fed. Rep. of Germany ................. 364/426.02

Primary Examiner—Robert R. Raevis
Attorney, Agent, or Firm—Beveridge, DeGrandi & Weilacher

[57] ABSTRACT

A set of wheel speed sensors forming parts of an anti-lock brake control system are tested for proper connection and operation when mounted on a motor vehicle. A check signal is first input to a sensor check terminal connected to a control circuit included in the brake control system, thereby causing the control circuit to light a warning lamp. Then the wheels of the vehicle are successively rotated in a predefined sequence and at a speed corresponding to the lowest vehicle speed at which the brake control system must be active. If all the wheel speed sensors deliver their outputs to the control circuit in the predetermined sequence, the warning lamp goes out to indicate proper functioning and proper connection of the sensors. The warning lamp remains illuminated if one or more of the wheel speed signals are not input to the control circuit or if the wheel speed signals are received by the control circuit in other than the predetermined sequence.

5 Claims, 4 Drawing Sheets

METHOD OF TESTING A SET OF WHEEL SPEED SENSORS FORMING PARTS OF AN ANTI-LOCK BRAKE CONTROL SYSTEM

This application is a division of U.S. Application Ser. No. 07/304,184 filed on Jan. 31, 1989.

BACKGROUND OF THE INVENTION

This invention relates to a method of testing a set of wheel speed sensors, included in an anti-lock brake control system for motor vehicles to produce signals indicative of the speeds of the vehicle wheels and thereby provide for proper functioning and proper electrical connections.

Hydraulic brake systems for motor vehicles are usually equipped with some form of anti-lock brake control system, or antiskid system, in order to prevent wheel lockup during braking. Should the brakes lock the vehicle wheels, they would begin to skid. Generally, in hydraulic brake systems, brake fluid is sent from a master cylinder to wheel cylinders at respective vehicle wheels upon application of a brake pedal. The wheel cylinders act to slow or stop the revolving wheels, which in turn slow or stop the vehicle.

Incorporated with the hydraulic brake system, the anti-lock brake control system functions to stop the supply of the brake fluid to the wheel cylinders, or to release the fluid pressure in the wheel cylinders, as required by the deceleration of the vehicle wheels or by the decrease of the wheel speed in relation to vehicle velocity. A set of wheel speed sensors are provided at each vehicle wheel for providing signals representative of the wheel speed. The wheel speed will increase again and come close to the vehicle velocity as a result of interaction will the road after the fluid pressure in the wheel cylinders is released. Thereupon, the control system will again permit delivery of the brake fluid to the wheel cylinders. The same cycle of brake pressure control is repeated thereafter as required for the most efficient braking.

Japanese Utility Model Laid-Open Publication No. 62-20367 proposes a trouble detection system for the wheel speed sensors of the anti-lock brake control system. This prior art system detects troubles associated with the wheel speed sensors when the wheel speed represented by the output from any wheel speed sensor drops and remains below a predetermined limit for a certain length of time while the vehicle is not braked. The trouble thus detected is, however, limited to disconnection, due to vehicle vibration, of the electrical connections between the wheel speed sensors and the logic controller of the anti-lock brake control system, or to the destruction of the tone wheel assemblies associated with the wheel speed sensors.

The wheel speed sensors must also be checked to see if they are connected to the correct terminals of the logic control circuit. If not, the control circuit would make incorrect interpretations of the incoming wheel speed signals and incorrectly control the wheel brakes. The conventional practice has been to use oscilloscopes or other testers external to the vehicle for detecting possible misconnections between the sensors and the control circuit.

There is another important test that must be conducted on wheel speed sensors. The anti-lock brake control system in general must function to prevent wheel lockup until immediately before the vehicle comes to a standstill after braking. The lowest vehicle speed at which the brake control system must function may, for example, be 2.75 kilometers per hour (km/h). Wheel speed sensors must be tested to make sure that they produce the proper signals at this lowest vehicle speed. This test has heretofore been made on wheel speed sensors before they are mounted in place on motor vehicles.

SUMMARY OF THE INVENTION

The present invention provides a simple, reliable, and thoroughly practicable method of testing a set of wheel speed sensors as mounted on a motor vehicle, in order to determine whether they are properly electrically connected to the control circuit of the anti-lock brake control system and whether they function properly at a given wheel or vehicle speed.

Briefly, according to the method of the invention, a sensor check terminal and a warning device such as a lamp are connected to the control circuit of the anti-lock brake control system. The set of wheel speed sensors to be tested are already mounted in place on the vehicle and electrically connected to the control circuit to enable the same to control the amount of rotational anti-lock as required by the actual speed of each wheel sensed by the wheel speed sensors during braking. The testing of the wheel speed sensors in place on the vehicle starts with the application of a check signal to the sensor check terminal. The control circuit responds to the check signal by lighting up the warning lamp. Then the wheels of the vehicle are successively revolved in a predetermined sequence and at a predetermined speed. The warning lamp goes out if all the wheel speed sensors deliver their outputs to the control circuit in the predetermined sequence as a result of the sequential revolution of the vehicle wheels. The warning lamp remains illuminated if one or more sensor outputs are not input to the control circuit or if the sensor outputs are input in other than the predetermined sequence.

Preferably, each vehicle wheel may be rotated at a speed corresponding to the guaranteed lowest vehicle speed at which the anti-lock brake control system must remain active. Then the test method of the invention serves two purposes. One is to make sure that the control circuit inputs the required wheel speed signals from all the sensors at the guaranteed lowest vehicle speed of anti-lock brake control operation. The other is to check that all the wheel speed sensors are correctly connected to the required terminals of the control circuit. The conventional off-board checker is no longer needed.

The above and other features and advantages of this invention and the manner of realizing the procedure mentioned above will be understood from a study of the following description and appended claims, with reference to the attached drawings showing a preferred mode of carrying out the invention.

DETAILED DESCRIPTION OF THE PREFERRED EMBODIMENT

Figure 1:
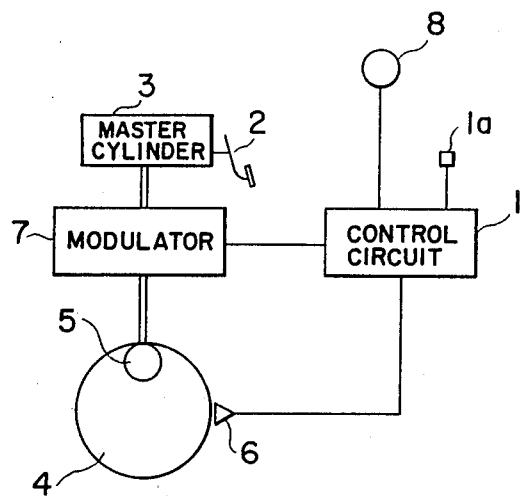
FIG. 1 is a block diagram of a motor vehicle anti-lock brake control system equipped for testing a set of wheel speed sensors incorporated therein according to the method of the invention.

The invention will now be described more specifically as embodied in the motor vehicle anti-lock brake control system illustrated diagrammatically in FIG. 1. Identified by reference numeral 1 in this diagram is an electronic control circuit, known as the logic controller, for automatically controlling the degree of rotational anti-lock during braking. A brake pedal 2 is mechanically linked to a master cylinder 3. As is well known, the master cylinder 3 sends hydraulic brake fluid to individual fluid-operated brakes 5 on respective vehicle wheels 4 upon application of the brake pedal 2. FIG. 1 shows only one representative vehicle wheel 4 together with the associated brake 5 for simplicity. It is understood that the other brakes (not shown) on the other wheels (not shown) are controlled in the like manner.

The control circuit 1 is electrically connected to a modulator 7 interposed between the master cylinder 3 and each wheel brake 5. Also connected to the control circuit 1 are a wheel speed sensor 6 associated with each veicle wheel 4, and a warning device such as a lamp 8.

Figure 3:
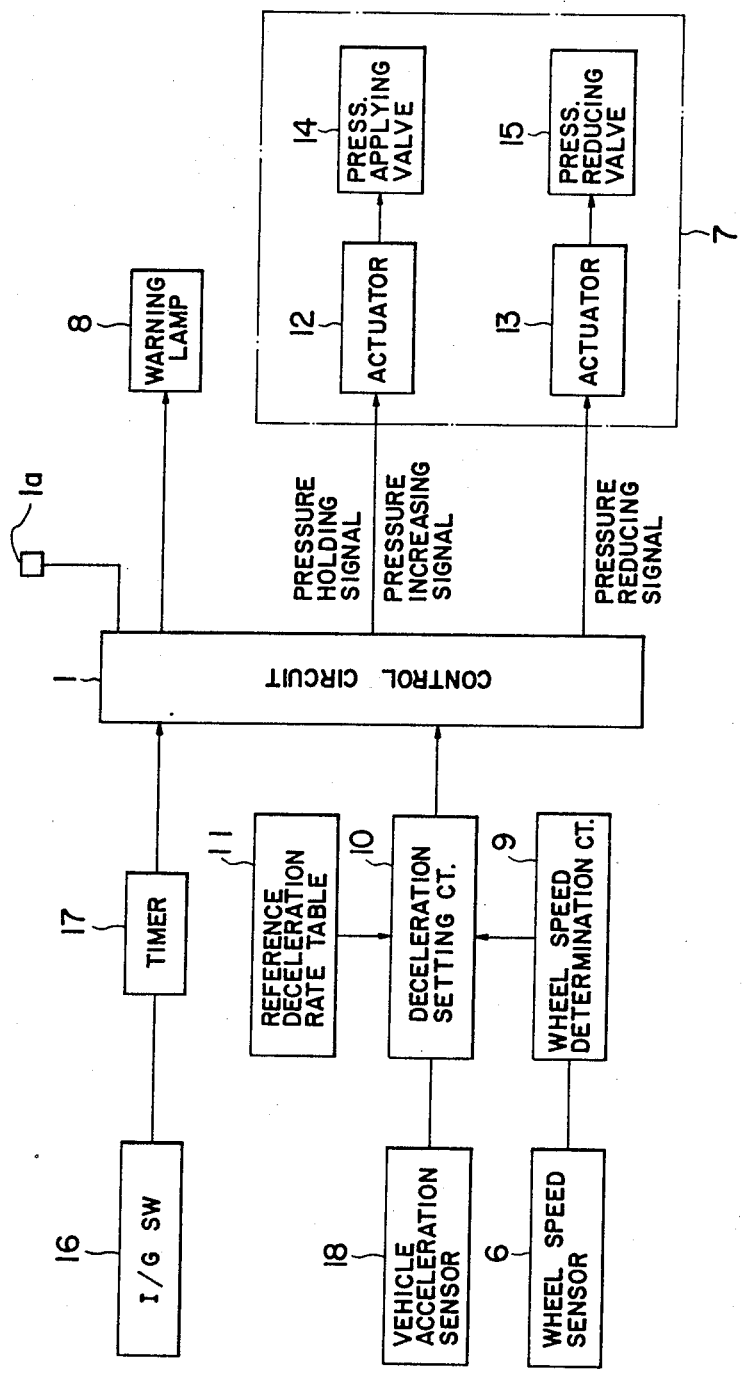
FIG. 3 shows a schematic block diagram of the anti-lock brake system.

Referring to FIG. 3 showing a schematic illustration of the anti-lock brake control system, the signal of the wheel speed detected by the wheel speed sensor 6 is sent to a wheel speed determination circuit 9 from which a wheel speed signal is sent to a deceleration setting circuit 10 in which the wheel speed signal is compared with a reference deceleration table 11 to thereby determine a constant to be multiplied with the value of the wheel speed signal. The value of the output control signal from the deceleration setting circuit 10 is thus determined and delivered to a control circuit 1, which is activated by a signal from the vehicle acceleration sensor (G-sensor) 18.

Thus, pressure holding, increasing and/or reducing signals are delivered from the control circuit 1 to actuator 12 or 13 to actuate a pressure applying valve 14 or a pressure reducing valve 15 of the modulator 7.

On the other hand, I/G switch 16 and timer 17 are connected to the control circuit 1.

When the vehicle wheels are braked by the application of the brake pedal 2, the wheel speed sensor 6 puts out a signal indicative of the deceleration of the associated wheel 4 shown in FIG. 3. The control circuit 1 responds when the wheel deceleration reaches a predetermined limit after comparing the data in the table 11, by signaling the modulator 7 to hold the corresponding wheel brake 5 under constant fluid pressure by opening a pressure applying valve 15. If the wheel speed further drops thereafter, the control circuit 1 again signals the modulator 7 to decrease the pressure on the wheel brake 5 by opening a pressure reducing valve 15. Then, as the wheel deceleration decreases to a predetermined minimum, the control circuit 1 resignals the modulator 7 to hold the wheel brake 5 under constant fluid pressure by the valve 14. The wheel speed may then build up as a result of interaction with the road and come close to the traveling speed of the vehicle. Thereupon the control circuit 1 resignals the modulator 7 to incrementally increase the fluid pressure on the wheel brake 5 by opening the pressure applying valve 14.

Thus, essentially, the hydraulic fluid pressure on each wheel brake is cyclically increased by the valve 14 and decreased by the valve 15 for optimum vehicle braking. The brake control method as so far described is, however, conventional in the art, and therein lies no feature of this invention.

As is also familiar to automotive specialists, the control circuit 1 is conventionally equipped for self-diagnosis, automatically detecting troubles such as breakage and shorting that may take place in the various parts of the anti-locK brake control system. In the event of such trouble the modulator 7 becomes electrically disconnected from its power supply (not shown). Automatic brake control against wheel lockup then is discontinued. Thereafter the brake fluid is fed directly from the master cylinder 3 to the wheel brakes 5. The warning lamp 8 glows during the progress of this direct braking mode to warn the vehicle operator of the fact that automatic anti-lock brake control is off.

The conventional self-diagnostic functions of the control circuit 1 have had their limitations pointed out earlier in this specification. Let it be supposed that there are some incorrect connections between the control circuit 1 and the wheel speed sensors 6. The control circuit would be unable to detect such incorrect connections if all the wheel speed sensors are themselves in good working order, because then they would provide the same output. The control circuit also would be incapable of checking whether or not the wheel speed sensors are producing the required signals at the predetermined lowest vehicle speed (e.g. 2.75 km/h) at which automatic anti-lock brake control is guaranteed to be in effect. The present invention provides an improved method of making such tests of the wheel speed sensors mounted in place on a motor vehicle as parts of the anti-lock brake control system.

Figure 2A:
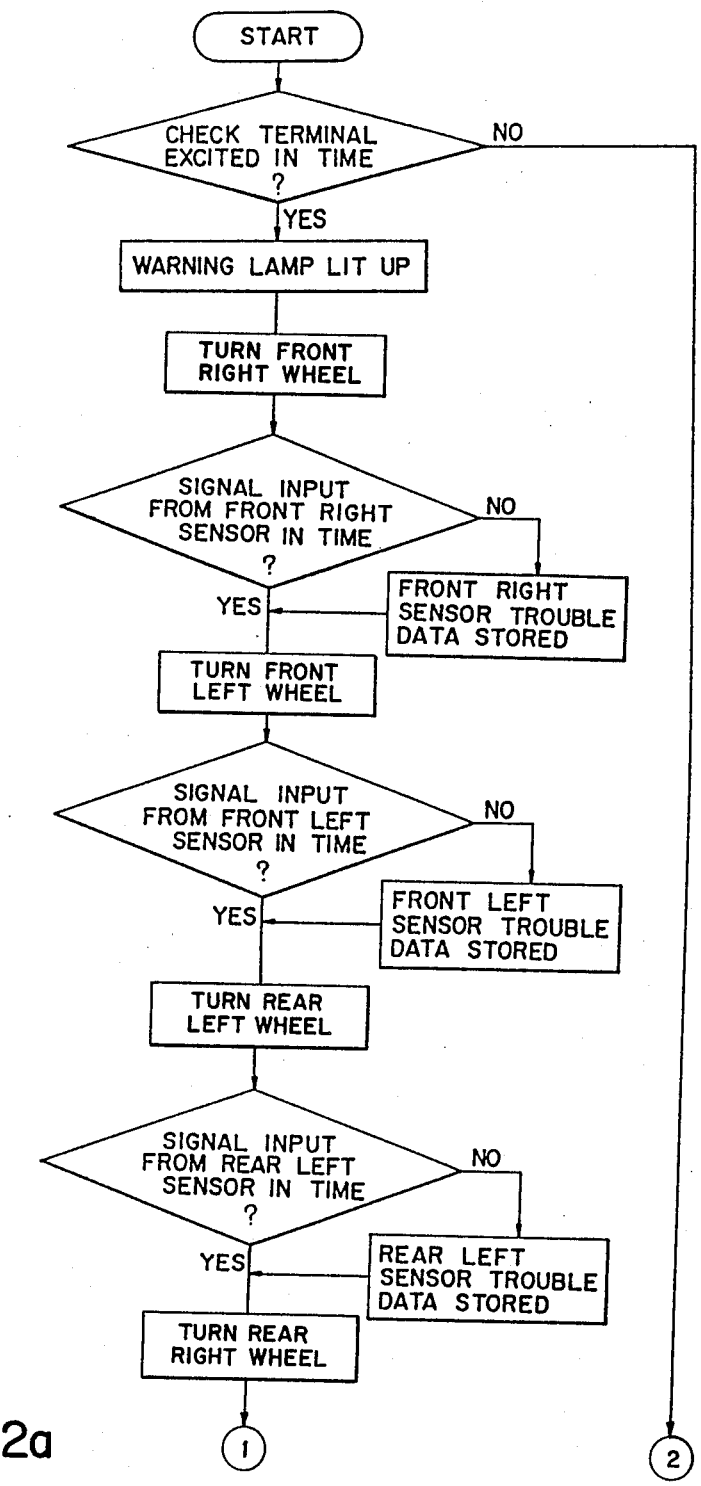
FIGS. 2a and 2b show a flow chart useful in understanding the sequential steps in accordance with the test method of the invention.
Figure 2B:
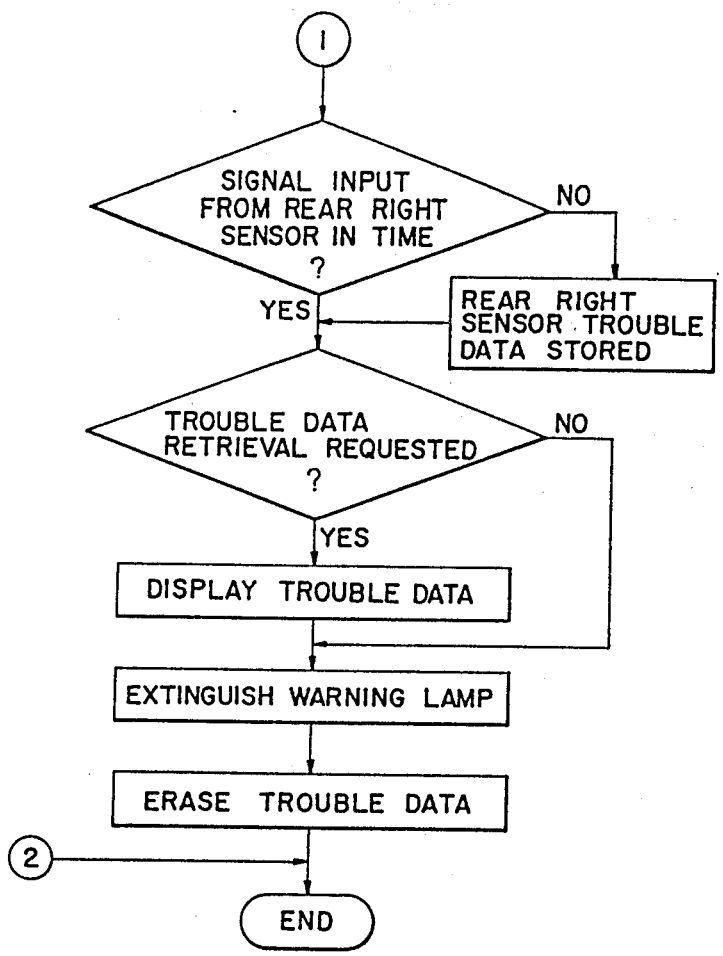

The method of the invention requires the connection of a check terminal 1a, in addition to the warning lamp 8, to the control circuit 1. Reference may be had to the flow chart of FIGS. 2a and 2b for the following detailed discussion of the inventive method.

The inventive method dictates, first of all, the application of a check signal (e.g. 12 volts supply voltage) to the check terminal 1a within a predetermined time (e.g. 10 seconds) after the startup of the vehicle engine, not shown, as by the actuation of an ignition switch. This check signal is intended to initiate the control circuit 1 into a sensor check mode. The control circuit 1 responds to the check signal by lighting up the warning lamp 8. The glowing lamp indicates that the control circuit 1 has entered the sensor check mode. The control circuit 1 is in a state to accept and check in a prescribed sequence the wheel speed signals from the respective wheel speed sensors 6 within a second preassigned time (e.g. one minute) after the lighting of the warning lamp 8.

Let us assume that the wheel speed sensors 6 are to be checked in the order of the front right wheel, the front left wheel, the rear left wheel, and the rear right wheel. Then the front right wheel is first rotated at a speed corresponding to the lowest anti-lock brake control speed of the vehicle, as by being placed in contact with a rotating drum. The control circuit 1 checks to see if the correct wheel speed signal from the wheel speed sensor 6 at the front right wheel is input to the control circuit. If it is, the control circuit 1 advances to a next step to check the next wheel speed signal from the wheel speed sensor at the front left wheel. The same procedure is repeated thereafter to successively check the signals from the sensors at the rear left wheel and the rear right wheel.

When all the wheel speed sensors 6 are found to be in normal operation, the control circuit 1 extinguishes the warning lamp 8 to indicate such. Then the sensor check mode comes to an end.

Possibly, the wheel speed signal from the front right wheel speed sensor may not be input to the control circuit 1 even though the front right wheel is rotated at the required speed within the second preassigned time. In that case the control circuit 1 memorizes the trouble with the front right wheel speed sensor and then waits for the wheel speed signal from the front left wheel speed sensor. Any detected trouble with any other wheel speed sensor is similarly memorized in the course of the successive testing of the sensors, as is apparent from the flow chart of FIG. 2.

Also, if the signals from all the wheel speed sensors are absent within the second preassigned time, the control circuit 1 memorizes this fact. Another possibility is that the wheel speed sensors could be erroneously connected to the control circuit 1. In that case the signal from one wheel speed sensor will be input to the control circuit as if from some other wheel speed sensor. The control circuit 1 memorizes all such troubles and continuously illuminates the warning lamp 8 to warn that one or more of the wheel speed signals are lacking, or that there has been an error in the sequence of the signals received.

Any trouble data that may have been stored as described above in connection with the control circuit 1 is subject to retrieval. For example, upon withdrawal of the check signal that has been impressed on the sensor check terminal 1a, the trouble data may be visually exhibited on a display, not shown, which would be connected to the control circuit 1. Then the control circuit proceeds to extinguish the warning lamp 8 to terminate the sensor check mode.

It is understood that the foregoing description represents but one of many possible modes of carrying out the method of the invention. Various modifications or alterations may be made in the details of this disclosure without departing from the scope of the invention. For instance, it is not essential that all the wheel speed sensors be tested within a predetermined time after the warning lamp is lit; instead, a different period may be determined for the testing of each wheel speed sensor.

What is claimed is:

1. A method of testing an anti-lock brake control system for a motor vehicle having a set of wheels, a wheel brake for each wheel, and a hydraulic unit to produce fluid pressure according to a predetermined sequence provided by the anti-lock brake control system, the anti-lock brake control system including a plurality of wheel speed sensors for detecting the rotational speed of each wheel and providing a wheel speed signal indicative thereof, a control circuit for controlling the fluid pressure, a terminal for receiving a check signal, and a warning device for indicating a malfunction of the anti-lock brake control system, the method of comprising the steps of:

connecting the terminal and the warning device to the control circuit;

applying a check signal received by the terminal to the control circuit;

determining whether the check signal is applied to the control circuit within a first predetermined time period;

maintaining the warning device in a check mode;

successively rotating each of the wheels at a predetermined brake control speed and detecting wheel speed signals from the wheel speed sensors within a second predetermined time period;

storing trouble data indicating that a speed sensor has failed to provide a wheel speed signal within the second predetermined time, retrieving any stored trouble data;

displaying the trouble data;

terminating the check mode of the warning device; and erasing the trouble data.

2. The testing method according to claim 1, wherein the predetermined brake control speed is a minimum speed at which the anti-lock brake system must remain active.

3. The testing method of claim 1, wherein the warning device is a lamp which is lit when maintained in the check mode.

4. The testing method of claim 1, wherein the check signal is applied to the sensor check terminal within a predetermined time after startup of the motor vehicle engine.

5. The testing method of claim 1, wherein the vehicle wheels are successively rotated within a predetermined time after the application of the check signal to the sensor check terminal.

* * * * *